March 29, 1960 F. H. RAYMOND 2,930,896

BINARY CODED INFORMATION STORES

Filed April 16, 1957

2,930,896

BINARY CODED INFORMATION STORES

François Henri Raymond, Saint-Germain-en-Laye, France, assignor to Societe d'Electronique et d'Automatisme, Courbevoie, France Application April 16, 1957, Serial No. 653,139

Claims priority, application France June 13, 1956

16 Claims. (Cl. 250—213)

The present invention relates to binary coded information stores for the temporary registration therein of information items each one of which consists of a "number-word" of a predetermined number of digits, and it more particularly relates to that kind of stores wherein the record of such informations comprises an electroluminescent layer whereon the digits or "bits" of information are distributed according to a predetermined raster, and with which are associated means for temporarily and controllably retaining the said items once they have been registered thereon as a light pattern representative of the codes of binary coded electrical signals from which have been derived the light patterns which have produced the electroluminescent activation of the said layer.

More specifically, the invention relates to such kind of information stores wherein the recording medium comprises a "sandwich" of at least one electroluminescent layer and one photoresistance layer, with or without any conductive translucent electrode therebetween, inserted between a pair of end-face electrodes one of which at least is translucent, and the areas of which are made suitable for the recording therein of a predetermined number of such number words as herein above defined. With such a structure, each bit of the store comprises one electroluminescent element and one photoresistive element which are series connected to a source applying a potential difference across the said end-face electrodes of the device, and which are optically cooperative. When a light pattern corresponding to a set of information items is obtained from an electro-optical distributor and focused upon the surface of the sandwich, and provided the potential difference is applied across the electrodes thereof the electroluminescent layer is activated at points corresponding to the points of illumination of the input light pattern. The corresponding points of the said photoresistive layer will have their local resistance value suddenly lowered so that at each activated point of the electroluminescent layer the full voltage difference between the electrodes will be applied and from reaction between the said electroluminescent and photoresistive spots, the recording will be maintained as long as the said electromotive force remains applied to the said sandwich. It is apparent that, in such a scheme, a plurality of information items may be entered at different instants of time but it is also apparent that the only way to re-write an information item in the place of one which has been previously recorded is to erase the whole record, by cutting off the said electromotive force from the sandwich, and re-writing therein the whole content of informations with the single required information items with the single required item modified as desired. Concerning the nature of the information maintaining potential difference, it may be noted that it may be a D.C. potential difference when the input pattern is periodically applied to the store (a case which does not actually concern the present invention) but when the information items are each given only once for recording therein, the said electromotive force must be an A.C. one but for special provisions in the respect of the constitution of the store. The invention is primarily concerned with such storage systems wherein each information item to be stored and displayed is available only once and not in a recurrently timed fashion, though of course it may be found of advantage even in the case of recurrent input information items as it then frees the system of timing limitations in the change of contents of part of the store by a simple erasing or a substitution of partial content thereof.

The object of the invention is to provide an information store of such a kind wherein the control operations of selective writing, maintaining and erasing are independent from the above-mentioned potential difference which may be permanently applied to the store, whereas each one of the said operations may be actually effected from distinct selections of parts of the store.

According to the invention, information storage means are provided which comprise the combination of an input converter for converting information signals into a light pattern, an electroluminescent storage element adapted to receive light patterns from said converter and means associated with said storage element for selectively rendering predetermined areas thereof responsive to light from corresponding areas of a light pattern received from said converter. Said storage element includes a first photoresistive member and an electroluminescent member and said means associated with said storage element includes a further photoresistive element adapted to be selectively illuminated over different areas thereof and serving jointly with said first photoresistive member to control the effective application of luminescence activating potential to corresponding areas of said electroluminescent member.

In the accompanying drawings, Figs. 1 and 2 respectively show two electrical diagrams explaining the operation of the invention;

Figure 1:
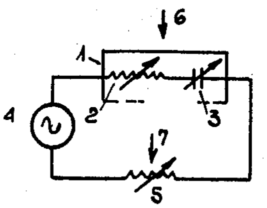
Figure 2:
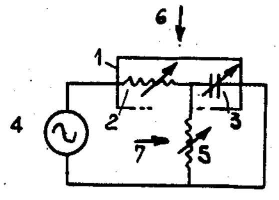

In the electrical diagram of Fig. 1 as well as in that of Fig. 2, the storing member proper is shown at 1 as comprising a variable resistance 2, representing the photoresistive layer therein, and a variable capacity 3, representing the electroluminescent layer therein, serially connected in the circuit of an E.M.F. source 4. In the diagram of Fig. 1, this serial connection also includes a variable resistance 5 whereas the said resistance 5 is shown in shunt of the capacity 3 in the diagram of Fig. 2. In both figures the said resistance 5 represents the additional control photoresistive layer provided according to the present invention.

The alternating voltage from 4 is such, in Fig. 1, that the threshold of the peak voltage across the electroluminescent layer 3 cannot be obtained and exceeded when both the resistances 2 and 5 are at their lower values, that is when both the photoresistive layers corresponding to the said resistances are illuminated. The mechanism of operation may be stated as follows: An information item arriving as a light pattern 6 onto the recording member 1, at a time when the photoresistive element 5 receives the light 7, will be duly impressed upon the said recording member 1. If such an information is applied at a time when the photoresistive layer 5 is not illuminated, it will not be impressed upon the recording member. Once an information item is recorded it will be stored in the store as long as the light 7 is maintained upon the said photoresistive layer 5. Erasure results from an interruption of the said control light 7. Such an elementary disclosure of operation obviously concerns a one word store but the application thereof to the actual multiple-word stores will be apparent from a later description of such stores.

In the diagram of Fig. 1, it is obviously a control of voltage which governs the operation. In the diagram of Fig. 2 it is a control of current: as soon as the resistance 2 is brought to the lower value thereof, the electroluminescent layer 3 receives the full voltage from the source 4 but either the resistance 5 in shunt across the said electroluminescent layer 3 is of the higher value or the lower value thereof. If it is at the said lower value, receiving the light 7, it will derive a major part of the current and consequently the electroluminescent layer is not activated. On the other hand, when the resistance 5 is at the higher value thereof, not receiving any light from 7, practically no substantial current will be taken by this resistance and the electroluminescent layer 3 will be activated in accordance to the light pattern from 6. The activation will be interrupted when the resistance 5 is illuminated at a later time of operation.

Figure 3:
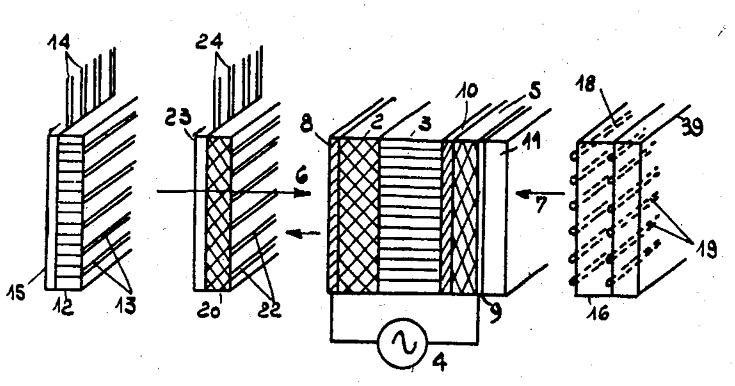
Fig. 3 shows a complete first embodiment of the invention.

In an actual store, the electroluminescent and photoresistive layers are of relatively broad areas since the store is designed to record a determined plurality of information words, most often one word per line of the light pattern of the raster thereof. The above-described mechanism must be understood as relating to each and any separate spot in the composite recording element of the store. For instance, the recording member of an information store embodying the present invention may be made such as shown in Fig. 3. The recording member comprises, between two end-face electrodes 8 and 9, the latter being supported by a translucent dielectric plate 11, the following components: a first photo-resistive layer 2, an electroluminescent layer 3 and a second photoresistive layer 5, but between the said said electroluminescent and second photoresistive layer, is inserted an opaque conductive or semi-conductive layer 10. The potential difference is applied across the electrodes 8 and 9.

Such a composite member may for instance be manufactured as follows: the electrode 9 is made by evaporation of a film of aluminum for instance over one face of a dielectric plate made of a high melting point glass. The plate coated with the electrode is placed within a vessel in close proximity to a layer of antimony for instance, which has been previously formed over a conducting supporting plate, for instance from evaporation of antimony under an average vacuum of, say $10^{-4}$, from crucibles arranged in front of the four corners of the said supporting plate, and heated. This will result in a layer of pure antimony of uniform thickness. A low pressure oxygen atmosphere is established within the said vessel and then a D.C. potential difference is applied between the said electrode 9 and the said plate bearing the antimony layer. This constitutes a ionic discharge device of such a density of ionic current that particles of antimony are extracted from the antimony layer, oxidised and transferred onto the said electrode 9. The operation is maintained as long as useful to obtain a layer of antimony oxide of the desired thickness, some hundredths of one millimeter for instance. This gives the photoresistive layer 5. Over the photoresistive layer 5 is coated a conducting opaceous layer, lampblack or/and indium antimonide. Then the preceding operation is repeated with the substitution of a zinc and copper alloy to the antimony layer. This will give the electroluminescent layer 3 constituted of zinc and copper oxides, and preferably, the operation includes the application of heat so that the said composition of electroluminescent oxides is obtained as a monocrystalline structure. Over the said electroluminescent layer is formed a further antimony oxide photoresistive layer, 2, and finally a further aluminum film electrode 8.

The above described storing member will receive any information as a pattern of light 6 impinging thereupon. The optical pattern signal generator may consist of an electro-optical distributor comprising an electroluminescent crystalline layer 12 between two networks of conductors, a network of horizontal conductors 13 and a network of vertical conductors 14. The number of conductors 13 is for instance made equal to the number of words to record at the full capacity of the store, the number of conductors 14 is then made equal to the number of digits of each and any of such words.

Such an electro-optical distributor may be made as follows: The network of conductors 14 is, for instance made over one face of a translucent dielectric plate 15 by first depositing thereon through a silk screen a mixture containing a metallic powder and a low melting point ceramic flux and then heating for obtaining a strong adherence of the lines on the dielectric plate. A galvanoplastic operation may be used to coat these lines by a further deposit of rhodium of such a thickness that it may thereafter be polished up to an optical polish. The monocrystalline layer 12 is then applied over the said network of conductors, for instance by the same operations as described for the manufacturing of the electroluminescent layer 3 of the recording member herein above described. The second network of conductors 13 is thereafter produced for instance through the same processing as for the network of conductors 14.

The light pattern of one word to be recorded is obtained as follows: The rest condition of the electro-optical distributor is such that the potentials of both the networks of conductors 13 and 14 are equal, so that no potential difference exists across the electroluminescent layer 12. When a number-word is to be recorded, or proposed for recording, the digit voltages thereof are simultaneously applied to corresponding conductors 14. Considering that the rest potentials of 13 and 14 have a zero value, and the activation potential difference across the electroluminescent material is comprised between 70 to 80 volts for instance, each digital value 1 in a word may present a voltage value of −50 volts. One line of the networks of conductors 13 will be selected by applying thereto a voltage of +50 volts for instance. Consequently the electroluminescent material 12 will only be activated along such a line 13 and only at places where the crossing conductors 14 bear a voltage of −50 volts. A light numerical code thus appears along the selected line 13 and, by means of a lens system, will be focused along a corresponding line of the storing member wherein each light spot will produce a localized and temporary lowering of the resistance of the layer 2. When, at the same time, the photoresistive layer 5 is illuminated along a corresponding line, Fig. 3, the numerical code of the word will be recorded from the localized activation of the electroluminescent layer 3 along the said corresponding line and at the said spots. This record will be maintained as long as the illumination of the layer 5 is maintained along the said corresponding line.

The control of the additional photoresistive layer 5 is effected by an electroluminescence cell comprising an electroluminescent layer 16 between a pair of armature networks of conductors 18 and 19 of relatively parallel lines and the selection control will be effected from the application thereacross of an A.C. potential difference between any pair of lines 18 and 19 corresponding in the information storing member to any corresponding line of information to be activated therefrom. A dielectric plate 39 bears thes control member of the device and is preferably opaque as the conductors 19 are preferably light-reflecting.

When a word is proposed for recording and the selection of the corresponding line in the layer 5 is not effected, then an inhibition of record is met. If such a word is to be substituted to a word which has been previously recorded, a temporary deactivation of the layer 5 from the control light generator will erase the said preceding word for enabling the introduction of a fresh word into the same location of the store without erasing any other information therein.

It is of course required to be able to "read" information items from the store and in this respect the store also includes a reading-out member herein comprising a thin semi-conducting layer 20, for instance of pure silicon and thus translucent, between a pair of networks of conductors each of which is translucent. A translucent dielectric plate of pure silica may bear this assembly which is arranged between the electro-optical distributor and the information retaining member of the store, and through which passes the light 6 for recording the input information items thereto. The readout selection may be effected by means of a bias selection control of the conductors 24 and 22 of the said networks. The electrical codes used may be of the series as well as of the parallel kind as required, according to manner of activation of the said conductors. Such a reading-out member may be obtained from successive depositions of a first network of conductors, a layer of pure silicon and a second network of conductors, through pyrolitic conversion processes of the materials constituting the said elements: each network may be made of conductors of a composition of boron and titan oxides, presenting a suitably low electrical resistance for the purposes herein afforded in that part of the store.

From the construction of the control member, it is apparent that selective recording, maintenance and erasing can be effected for each word of information; with relatively orthogonal networks of conductors 18 and 19, such a selection characteristic may be obtained, when required, for each digit or bit of information in the store. Of course in the control member the applied selection voltages always are of an A.C. character for sustaining the activation thereof and also the activation of the storing member corresponding thereto.

It may however be thought of advantage not to have to introduce the reading-out member of the store between the light code generator thereof, viz. the electro-optical distributor, and the recording member, but on the other hand, to be able to place the said reading-out members on the opposite side of the said recording member with respect to the said electro-optical distributor. When a line-per-line selection suffices, this will be a somewhat simple matter, as shown in Figs. 4 and 5, and further this will avoid the recourse to an electrically conducting but light opaque layer such as 10 in Fig. 3.

The area of the supporting translucent plate 11 of the storing member is made somewhat higher than twice the area of each layer in the said member. A network of conductors 30, Fig. 5, are made over one face of the said plate 11, each one of the said conductors corresponding to one line of information in the store but of greater than double length thereof. Such conductors may be made of a composition of boron and titan oxides and consequently translucent and of low electrical resistance and the plate 11 may be made of pure silica. Consequently, once the layers 3—2 on the one part, and 5 on the other part, are made as shown over such a network of conductors a definite and straight galvanic correspondence is created between the lines of the composite structure 3—2 and the lines of the additional photoresistive layer 5, Fig. 4. The electrodes 8 and 9 are respectively applied to the composite layer 2—3 and to the layer 5 and the A.C. potential from 4 is applied to the storing member across the said electrodes as in Fig. 3. The operation is obvious and not different from the one disclosed with respect to Fig. 3: when a light pattern of an information word proposed for recording falls through the light 6 onto one line of the recording member, it will or will not be recorded according to whether the corresponding line is or is not illuminated by the control light 7 in the layer 5; and so forth.

Figure 4:
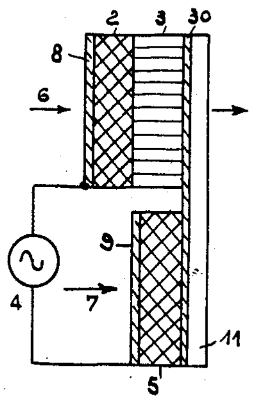
Figs. 4 to 6 show parts of the store of Fig. 3 and modified according to certain particular changes therein when only a word per word control is deemed necessary for the operation of the store.

The above described embodiments of Figs. 3 and 4 are based on the electrical diagram of Fig. 1. The modification of the embodiment of Fig. 4 to that of Fig. 6, corresponding to the electrical diagram of Fig. 2 is quite simple: the intermediate network of conductors 30 is made, with the same pattern as the one shown in Fig. 5, partly between the photoresistive layer 2 and the electroluminescent layer 3 of the device and an additional armature 29 coats the other face of the photoresistive layer 5 and is galvanically connected to the electrode 9 coating the layer 3, so that lines of the additional photoresistive layer 5 are respectively in shunt across corresponding linear portions of the electroluminescent layer 3 as required for the electrical interconnection of such components. For simplicity in manufacture the supporting translucent plate 11 is shown as bearing the electrodes 8 and 29, then the two photoresistive layers 2 and 5 (of identical material) over which is formed the network of conductors 30, and the electroluminescent layer 3 is then formed over that part of the said network lying upon the photoresistive layer 2. The operation of such a device is apparent from what has been said concerning the diagram of Fig. 2.

Figure 5:
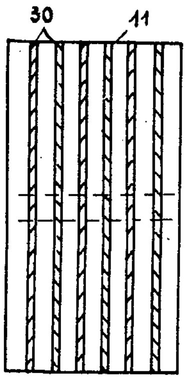
Figure 6:
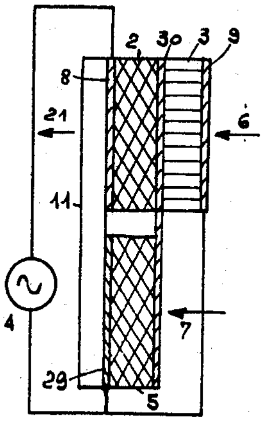

In Figs. 4 and 5, the other component members of the store have not been shown but their relation to the storing member are quite obvious.

What is claimed is:

1. A binary coded information store comprising in combination a recording member, an electro-optical distributor for converting each incoming electrical code signal into a light pattern focussed onto the said recording member and at a definite location thereon, and a photoelectric read-out device for selectively reading-out the informations recorded in the said recording member, the said recording member comprising a first photoresistive layer and an electroluminescent layer which are optically related so that any light from an activated spot of the said electroluminescent layer will affect the resistance of a corresponding spot in the said photoresistive layer, said optically related layers being interposed between a pair of conducting electrodes, at least one of which is translucent an alternating current electromotive force connected across said electrodes so that any electrical coupling of optically related spots in the said layers is serially connected in the electrical circuit of the said electromotive force, the said recording member further including a second photoresistive layer optically unrelated to the said electroluminescent layer means electrically connecting predetermined areas of the second photoresistive layer to corresponding areas of the electroluminescent member for controlling from localized changes of resistance of the said second photoresistive layer the electrical conditions of activation of the said electroluminescent layer at corresponding locations thereof, and a selectively controllable illumination member for selectively controlling localized changes of resistance over the area of the said second photoresistive member.

2. A combination according to claim 1 in which the said corresponding areas of the said electroluminescent layer and the said second photoresistive layer are so connected that each point of the said second photoresistive layer is introduced in series electrical relation with each corresponding point of the said electroluminescent layer and the electromotive force.

3. A combination according to claim 1 in which the said corresponding areas of the said electroluminescent layer and the said second photoresistive layer are so connected that each point of the useful area of the said second photoresistive layer is introduced in shunt electrical relation with each corresponding point of the said electroluminescent layer.

4. A combination according to claim 2 in which the said second photoresistive layer is interposed in the said recording member between the said electroluminescent layer and a conducting electrode of the said recording member, the means electrically connecting predetermining areas comprising a light opaque layer between the said electroluminescent layer and the said second photoresistive layer.

5. A combination according to claim 2 in which said second photoresistive layer is interposed in said recording member as an intermediate layer between the said electroluminescent layer and a conducting electrode of the said recording member, a supporting plate for the second photoresistive layer distinct from said electroluminescent layer, the means electrically connecting predetermined areas comprising a plurality of separate conductors connecting the corresponding areas of the second photoresistive and electroluminescent layers.

6. A combination according to claim 5 in which the said conductors include a plurality of parallelly extending lines over both areas of the said electroluminescent and second photoresistive layers.

7. A combination according to claim 3 in which a further translucent electrode is located between the electroluminescent and first photoresistive layers, said second photoresistive layer having a pair of opposed electrodes one of which is connected to the conducting electrode of the electroluminescent layer and the other of which is connected to the further translucent electrode to constitute therewith the said means electrically connecting predetermined areas.

8. A combination according to claim 7 and having a common dielectric plate for supporting the conducting electrode of the first photoresistive layer and the one electrode of the second photoresistive layer in spaced relation, said other electrode of the second photoresistive layer and the further translucent electrode comprising separate conductors, corresponding conductors of the layers being electrically connected.

9. A combinaation according to claim 8 and wherein the said conductors are shaped as conducting lines parallelly extending without interruption over the one and the other of the areas of the said first and second photoresistive layers, the said electroluminescent layer being supported over one of the said areas of the said networks.

10. A combination according to claim 1 and wherein the said electro-optical distributor comprises an electroluminescent layer between two relatively orthogonal networks of conductors.

11. A combination according to claim 1 in which the said illumination member for the said second photoresistive layer is formed as an electroluminescent layer between two networks of conducting lines, one of which is translucent, the light from the said illumination member being focussed onto the said second photoresistive layer of the store.

12. A combination according to claim 1 in which the said photoelectric read-out device comprises a layer of translucent photoresistive material between a pair of electrodes each of which is shaped as a network of parallel lines, the network being orthogonally related.

13. A combination according to claim 12 in which both the said networks of conductors are translucent, the said read-out device being located between the said electro-optical distributor and the said recording member of the store.

14. A combination according to claim 12 and wherein one of the said networks is translucent and the said read-out device is located in front of a part of the said storing member wherein appears the light pattern of the informations stored therein but separate from that part of the said recording member comprising the said second photoresistive layer.

15. An information storage device comprising in combination an input converter for converting electrical information signals applied thereto into a light pattern, an electroluminescent storage element for receiving light patterns from said converter including a first photoresistive member and an electroluminescent member, means associated with said storage element for selectively rendering predetermined areas thereof responsive to light from corresponding areas of a light pattern received from said converter including a second photoresistive element adapted to be selectively illuminated over different areas thereof, said photoresistive elements being connected to a source of potential and cooperating with each other for controlling the effective application of luminescence activating potential to corresponding areas of said electroluminescent member.

16. An information storage device for storing information signals in the form of a light pattern comprising a first photoresistive member exposed to said light pattern, an electroluminescent member coupled to the photoresistive member, a second photoresistive member adapted to be selectively illuminated over different areas thereof and coupled to the electroluminescent member, said photoresistive members being connectible to a source of luminescence activating potential and cooperating to control the effective application of such potential to corresponding areas of said electroluminescent member.

References Cited in the file of this patent

"Optical Storage Cells and Switches," Quarterly Report #3, Mellon Institute of Industrial Research, Fellowship on Computer Components #347, July 17, 1952.

"Photo-Conductive Films," Quarterly Report #6, Second Series of the Computer Components Fellowship No. 347, January 1 to March 31, 1955.

UNITED STATES PATENT OFFICE

CERTIFICATE OF CORRECTION

Patent No. 2,930,896 March 29, 1960

François Henri Raymond

It is hereby certified that error appears in the printed specification of the above numbered patent requiring correction and that the said Letters Patent should read as corrected below.

Column 6, line 42, after "translucent" insert a comma; line 48, after "layer" insert a comma.

Signed and sealed this 1st day of November 1960.

(SEAL)

Attest:

KARL H. AXLINE
Attesting Officer

ROBERT C. WATSON
Commissioner of Patents